United States Patent
Hayashi (10) Patent No.: US 10,604,365 B2
(45) Date of Patent: Mar. 31, 2020

(54) IMAGE READING DEVICE

(71) Applicant: PFU LIMITED, Ishikawa (JP)

(72) Inventor: Ryo Hayashi, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 16/026,884

(22) Filed: Jul. 3, 2018

(65) Prior Publication Data

US 2019/0291988 A1    Sep. 26, 2019

(30) Foreign Application Priority Data

Mar. 20, 2018   (JP) .................................. 2018-052019

(51) Int. Cl.
*B65H 5/06*    (2006.01)

(52) U.S. Cl.
CPC ....... *B65H 5/062* (2013.01); *B65H 2402/633* (2013.01); *B65H 2403/80* (2013.01); *B65H 2601/11* (2013.01)

(58) Field of Classification Search
CPC .......... B65H 2402/633; B65H 2403/80; B65H 2601/11
See application file for complete search history.

(56) References Cited

U.S. PATENT DOCUMENTS

| | | | | |
|---|---|---|---|---|
| 5,152,519 A * | 10/1992 | Ifkovits, Jr. .......... | B65H 3/5238 |
| | | | 271/10.11 |
| 5,203,217 A * | 4/1993 | Buckley ................ | B41J 11/006 |
| | | | 271/160 |
| 5,205,551 A * | 4/1993 | Nagano ................ | G03G 15/234 |
| | | | 198/463.4 |
| 6,206,368 B1 * | 3/2001 | Kobayashi .......... | B65H 3/5261 |
| | | | 271/10.11 |

FOREIGN PATENT DOCUMENTS

| JP | 59-194956 A | 11/1984 |
|---|---|---|
| JP | 2006-312323 A | 11/2006 |

* cited by examiner

*Primary Examiner* — Howard J Sanders
(74) *Attorney, Agent, or Firm* — McDermott Will & Emery LLP

(57) ABSTRACT

An image reading device includes a first roller that is rotatably supported by a frame, a second roller that is supported by the frame in a rotatable and translatable manner and that presses a medium against the first roller, a joint unit that transmits rotation from a drive shaft to the second roller, a drive unit that rotates both the first roller and the drive shaft, and a read unit configured to read an image on a conveyed medium that is conveyed by the rotation of the both of the first roller and the second roller.

4 Claims, 9 Drawing Sheets

IMAGE READING DEVICE

CROSS-REFERENCE TO RELATED APPLICATION

The application is based upon and claims the benefit of priority of the prior Japanese Patent Application No. 2018-052019 filed in Japan on Mar. 20, 2018, the entire contents of which are incorporated herein by reference.

FIELD

The embodiments discussed herein are related to an image reading device.

BACKGROUND

There are known image reading devices that convey a medium and reads an image on the conveyed medium. This type of image reading devices include a feed roller and a pressure roller, and a medium is conveyed when the feed roller is rotated while the medium is pressed against the feed roller by the pressure roller.

Japanese Laid-open Patent Publication No. 59-194956 discloses a sheet feeding mechanism that is a simple mechanism capable of feeding sheets including a single sheet and a thick sheet in a certain and accurate manner. Japanese Laid-open Patent Publication No. 2006-312323 discloses a printer in which media may be easily placed and conveyance jam does not occur while the size of the device does not become larger due to an increase in the number of components.

Booklets formed by binding a plurality of pieces of media are thicker than a single medium and therefore it has a problem in entering into a roller nip, which sometimes results in the occurrence of defects during conveyance. Due to the occurrence of defects during conveyance, when an image reading device reads an image on the medium, a defect such as image elongation may occur. When a driven roller is not properly rotated, bend may occur while a booklet is conveyed. Due to the occurrence of bend, it may be difficult for the image reading device to properly read images. When a booklet is conveyed while it is sandwiched between carrier sheets, the image reading device may prevent the occurrence of bend, and images on the booklet may be properly read. Unfortunately, there is a problem of undesirable operability because preparation is needed to sandwich a booklet between carrier sheets.

SUMMARY

According to an aspect of an embodiment, an image reading device includes a first roller that is rotatably supported by a frame, a second roller that is supported by the frame in a rotatable and translatable manner and that presses a medium against the first roller, a joint unit that transmits rotation from a drive shaft to the second roller, a drive unit that rotates both the first roller and the drive shaft, and a read unit configured to read an image on a conveyed medium that is conveyed by the rotation of the both of the first roller and the second roller.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

Preferred embodiments of the disclosure will be explained with reference to accompanying drawings. An image reading device according to an embodiment of the present disclosure is explained below with reference to drawings. The technology of the present disclosure is not limited to the description below. In the description below, the same components are attached with the same reference numeral, and duplicated explanation is omitted.

First Embodiment

Figure 1:
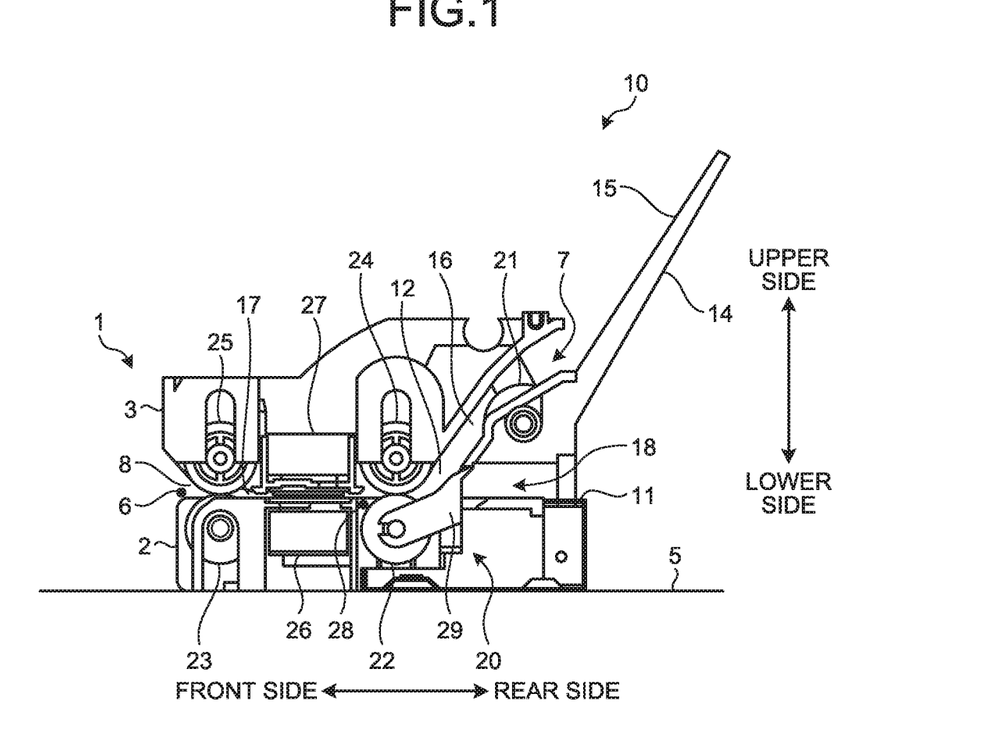
FIG. 1 is a sectional side view of an image reading device according to a first embodiment.

FIG. 1 is a sectional side view of an image reading device according to a first embodiment. As illustrated in FIG. 1, an image reading device 10 includes a frame 1. The frame 1 includes a fixed-side frame 2 and a movable-side frame 3. The fixed-side frame 2 is placed on an installation surface 5 where the image reading device 10 is installed, and it is fixed to the installation surface 5. The movable-side frame 3 is located above the fixed-side frame 2. The movable-side frame 3 is supported by the fixed-side frame 2 such that it is rotatable around a rotation axis 6 as its center to be located at a closed position or an open position. The rotation axis 6 is parallel to a plane along the installation surface 5.

In the image reading device 10, a separation opening 7, a non-separation opening 8, a back-surface side opening 11, and a meeting point 12 are formed. The separation opening 7 is formed on the rear side of the image reading device 10, and it is formed between the fixed-side frame 2 and the movable-side frame 3. The non-separation opening 8 is formed on the front side of the image reading device 10, on the opposite side of the rear side where the separation opening 7 is formed, and it is formed between the fixed-side frame 2 and the movable-side frame 3. The non-separation opening 8 is formed on a lower position closer to the installation surface 5 than the position where the separation opening 7 is formed. The back-surface side opening 11 is formed on the side closer to the installation surface 5 than the separation opening 7 at the rear side of the image reading device 10, and it is formed such that the distance between the installation surface 5 and the back-surface side opening 11 is equal to the distance between the installation surface 5 and the non-separation opening 8. The meeting point 12 is formed between the non-separation opening 8 and the back-surface side opening 11, and it is formed between the fixed-side frame 2 and the movable-side frame 3. The meeting point 12 is formed such that the distance between the installation surface 5 and the meeting point 12 is equal to the distance between the installation surface 5 and the non-separation opening 8 or the back-surface side opening 11.

The image reading device 10 further includes a hopper 14. A placement surface 15 is formed on the hopper 14. The hopper 14 is installed such that the placement surface 15 faces obliquely upward and the angle made by a plane along the placement surface 15 and a plane along the installation surface 5 is substantially equal to 55°. The hopper 14 is located near the separation opening 7 and is fixed to the fixed-side frame 2 such that a medium placed on the placement surface 15 moves toward the separation opening 7 due to gravity.

In the image reading device 10, a medium-separation conveyance path 16, a medium-reading conveyance path 17, and a medium-drawing conveyance path 18 are further formed. The medium-separation conveyance path 16 is formed between the fixed-side frame 2 and the movable-side frame 3. The medium-separation conveyance path 16 connects the separation opening 7 and the meeting point 12, and it is tilted with respect to a plane along the installation surface 5 such that the end at the side close to the meeting point 12 is located lower than the end at the side close to the separation opening 7. The medium-reading conveyance path 17 is formed such that it extends along another plane parallel to the plane along the installation surface 5, it is formed between the fixed-side frame 2 and the movable-side frame 3, and it connects the non-separation opening 8 and the meeting point 12. The medium-drawing conveyance path 18 is formed such that it extends along a plane along which the medium-reading conveyance path 17 extends, it is formed inside the fixed-side frame 2, and it connects the back-surface side opening 11 and the meeting point 12.

The image reading device 10 further includes a conveying unit 20. The conveying unit 20 includes a separation unit 21, a first feed roller 22, a second feed roller 23, a first pressure roller 24, and a second pressure roller 25. The separation unit 21 is formed in the middle of the medium-separation conveyance path 16. The separation unit 21 separates one medium in contact with the placement surface 15 of the hopper 14 from the media inserted into the medium-separation conveyance path 16 through the separation opening 7 and conveys the separated medium from the separation opening 7 toward the meeting point 12 through the medium-separation conveyance path 16.

The first feed roller 22 is formed into a cylindrical shape. The first feed roller 22 is located under the medium-reading conveyance path 17, and it is rotatably supported by the fixed-side frame 2. The first feed roller 22 is rotated forward (a counterclockwise direction of FIG. 1) to convey the medium located on the medium-reading conveyance path 17 from the meeting point 12 toward the non-separation opening 8. The second feed roller 23 is located between the first feed roller 22 and the non-separation opening 8 under the medium-reading conveyance path 17, and it is rotatably supported by the fixed-side frame 2. The second feed roller 23 is rotated forward (a counterclockwise direction of FIG. 1) to convey the medium located on the medium-reading conveyance path 17 from the meeting point 12 toward the non-separation opening 8.

The first pressure roller 24 is formed into a cylindrical shape, and it is formed such that the diameter of the first pressure roller 24 is equal to the diameter of the first feed roller 22. The first pressure roller 24 is located above the medium-reading conveyance path 17, and it is provided on the first feed roller 22. The first pressure roller 24 is supported by the movable-side frame 3 such that it is translatable in a vertical direction perpendicular to a plane along the installation surface 5 and it is rotatable. The first pressure roller 24 presses the medium provided on the medium-reading conveyance path 17 against the first feed roller 22 and rotates forward (a clockwise direction of FIG. 1) to convey the medium provided on the medium-reading conveyance path 17 from the meeting point 12 toward the non-separation opening 8.

The second feed roller 23 is formed into a cylindrical shape, and it is formed such that the diameter of the second feed roller 23 is equal to the diameter of the first feed roller 22. The second feed roller 23 is located between the first feed roller 22 and the non-separation opening 8 under the medium-reading conveyance path 17, and it is rotatably supported by the fixed-side frame 2. The second feed roller 23 is rotated forward (a counterclockwise direction of FIG. 1) to convey the medium provided on the medium-reading conveyance path 17 from the meeting point 12 toward the non-separation opening 8.

The second pressure roller 25 is formed into a cylindrical shape, and it is formed such that the diameter of the second pressure roller 25 is equal to the diameter of the second feed roller 23. The second pressure roller 25 is located above the medium-reading conveyance path 17, and it is provided on the second feed roller 23. The second pressure roller 25 is supported by the movable-side frame 3 such that it is translatable in a vertical direction and it is rotatable. The second pressure roller 25 presses the medium provided on the medium-reading conveyance path 17 against the second feed roller 23 and rotates forward (a clockwise direction of FIG. 1) to convey the medium provided on the medium-reading conveyance path 17 from the meeting point 12 toward the non-separation opening 8.

The image reading device 10 further includes a lower-side read unit 26 and an upper-side read unit 27. The lower-side read unit 26 is located under the medium-reading conveyance path 17, and it is located between the first feed roller 22 and the second feed roller 23. The lower-side read unit 26 reads an image on the lower side of a medium conveyed through the medium-reading conveyance path 17. The upper-side read unit 27 is located above the lower-side read unit 26 and above the medium-reading conveyance path 17, and it is located between the first pressure roller 24 and the second pressure roller 25. The upper-side read unit 27 reads an image on the upper side of a medium conveyed through the medium-reading conveyance path 17.

The image reading device 10 further includes a medium-position detection sensor 28. The medium-position detection sensor 28 is located under the medium-reading conveyance path 17, and it is located between the first feed roller 22 and the lower-side read unit 26. The medium-position detection sensor 28 detects whether a medium is located at a medium detection position between the first feed roller 22 and the lower-side read unit 26 on the medium-reading conveyance path 17, and it detects the timing in which the edge of the medium passes through a medium detection position.

The image reading device 10 further includes a conveyance-path switch flap 29. The conveyance-path switch flap 29 is located at the meeting point 12, and it is rotatably supported by the fixed-side frame 2 such that it is located at a separating and conveying position and a switchback conveying position. The conveyance-path switch flap 29 is moved to the separating and conveying position when the first feed roller 22 rotates forward, and it is moved to the switchback conveying position when the first feed roller 22 rotates in reverse. When the conveyance-path switch flap 29 is located at the separating and conveying position, it blocks the medium-drawing conveyance path 18 from the meeting point 12 and guides a medium, conveyed from the separation opening 7 to the meeting point 12 through the medium-separation conveyance path 16, to the medium-reading conveyance path 17.

Figure 2:
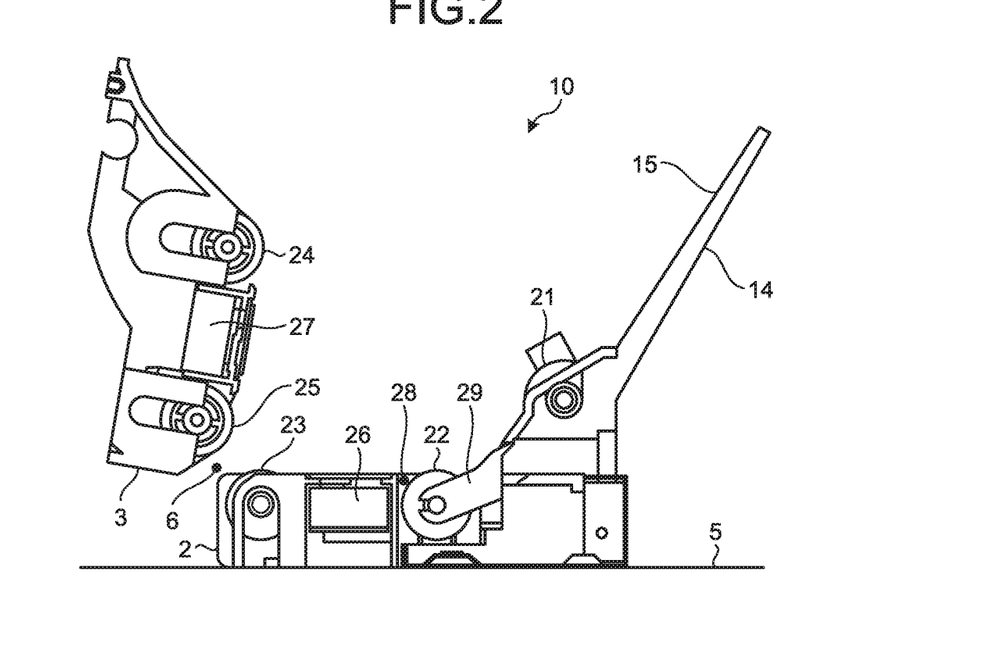
FIG. 2 is a sectional side view of the image reading device when a movable-side frame is located at an open position.

FIG. 2 is a sectional side view of the image reading device 10 when the movable-side frame 3 is located at the open position. When the movable-side frame 3 is located at the open position, the first pressure roller 24 separates from the first feed roller 22, as illustrated in FIG. 2. When the movable-side frame 3 is located at the open position, the second pressure roller 25 separates from the second feed roller 23.

Figure 3:
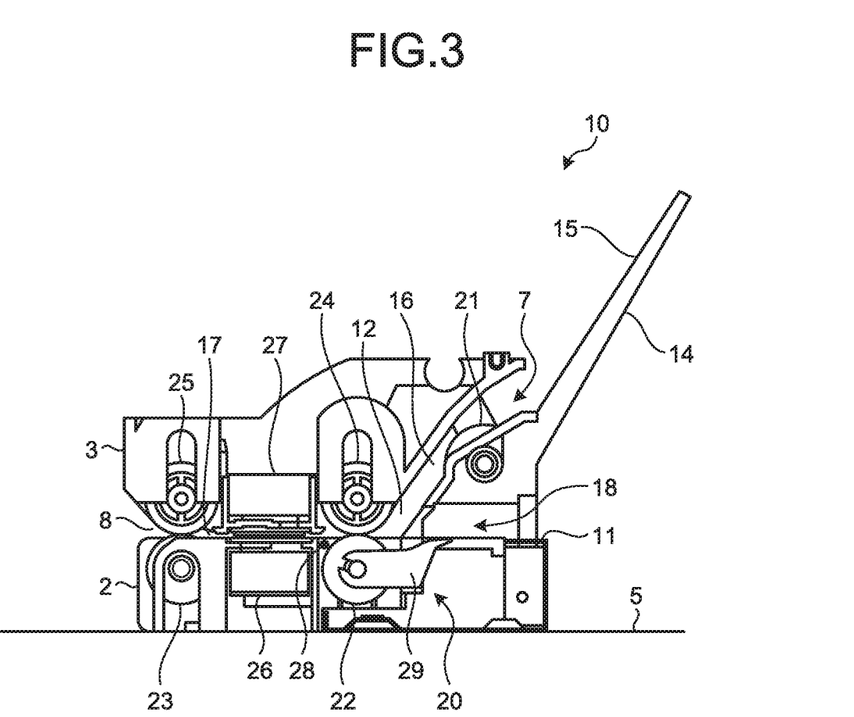
FIG. 3 is a sectional side view of the image reading device when a conveyance-path switch flap is located at a switch-back conveying position.

FIG. 3 is a sectional side view of the image reading device 10 when the conveyance-path switch flap 29 is located at the switchback conveying position. As illustrated in FIG. 3, when the conveyance-path switch flap 29 is located at the switchback conveying position, it connects the meeting point 12 to the medium-drawing conveyance path 18 to guide the medium, conveyed from the non-separation opening 8 to the meeting point 12 through the medium-reading conveyance path 17, to the medium-drawing conveyance path 18.

Figure 4:
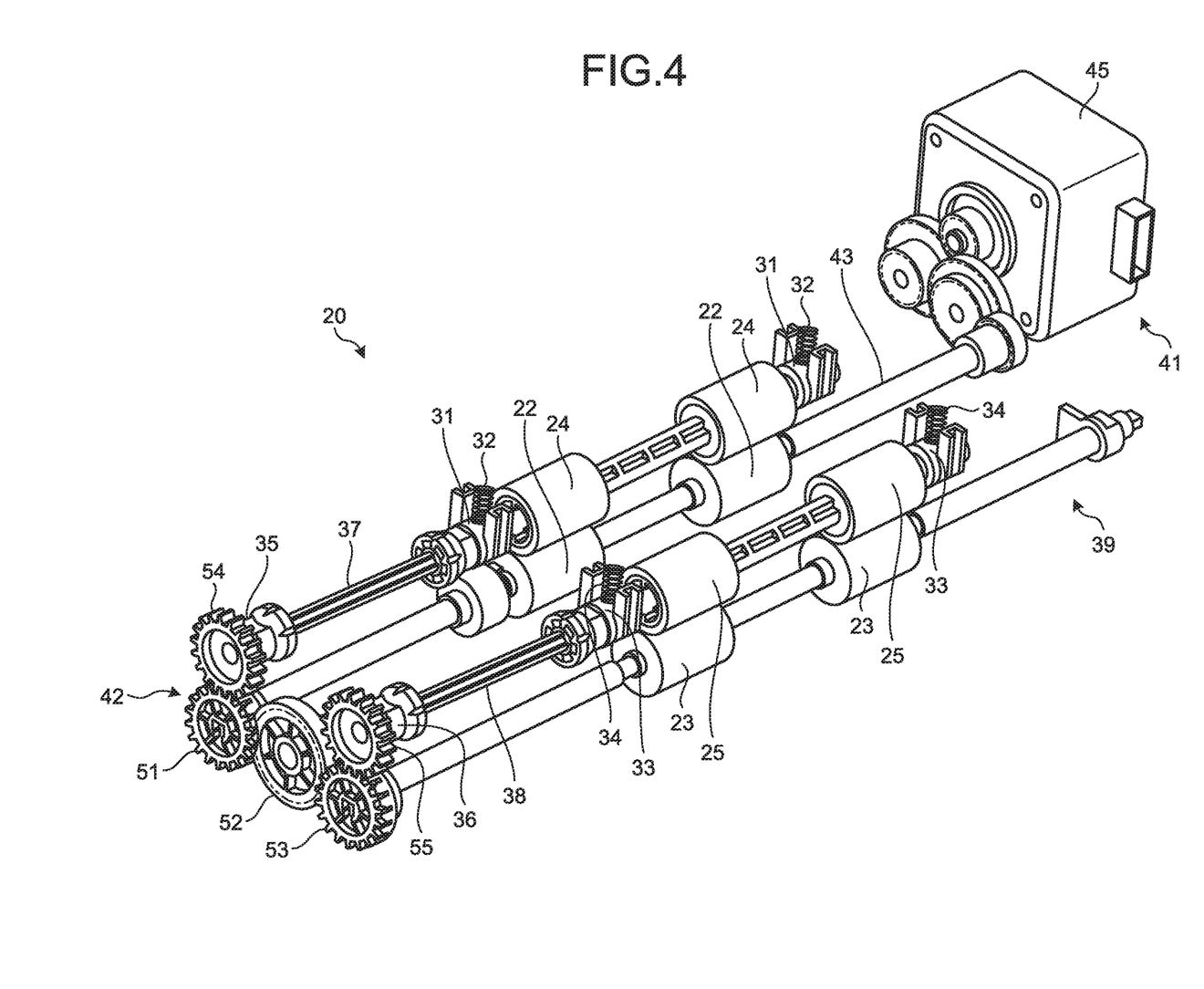
FIG. 4 is a perspective view of a conveying unit.

FIG. 4 is a perspective view of the conveying unit 20. As illustrated in FIG. 4, the conveying unit 20 further includes a first shaft bearing 31, a first pressure spring 32, a second shaft bearing 33, and a second pressure spring 34. The first shaft bearing 31 is supported by the movable-side frame 3 such that it is translatable in a vertical direction. The first pressure roller 24 is rotatably supported by the first shaft bearing 31. Specifically, the first pressure roller 24 is supported by the movable-side frame 3 through the first shaft bearing 31 such that it is translatable in a vertical direction and it is rotatable. The first pressure spring 32 applies elastic force to the first shaft bearing 31 so that the first pressure roller 24 moves close to the first feed roller 22 when the movable-side frame 3 is located at the closed position.

The second shaft bearing 33 is supported by the movable-side frame 3 such that it is translatable in a vertical direction. The second pressure roller 25 is rotatably supported by the second shaft bearing 33. The second pressure roller 25 is supported by the movable-side frame 3 such that it is translatable in a vertical direction and it is rotatable. The second pressure spring 34 applies elastic force to the second shaft bearing 33 so that the second pressure roller 25 moves close to the second feed roller 23 when the movable-side frame 3 is located at the closed position. The elastic force applied by the second pressure spring 34 to the second shaft bearing 33 is smaller than the elastic force applied by the first pressure spring 32 to the first shaft bearing 31.

The conveying unit 20 further includes a first-pressure roller drive shaft 35, a second-pressure roller drive shaft 36, a first joint unit 37, a second joint unit 38, and a roller drive unit 39. The first-pressure roller drive shaft 35 is rotatably supported by the movable-side frame 3. The second-pressure roller drive shaft 36 is rotatably supported by the movable-side frame 3. The first joint unit 37 is made of a universal joint, and it transmits rotation of the first-pressure roller drive shaft 35 to the first pressure roller 24 even when the rotation axis of the first pressure roller 24 does not match the rotation axis of the first-pressure roller drive shaft 35. The second joint unit 38 is made of a universal joint, and it transmits rotation of the second-pressure roller drive shaft 36 to the second pressure roller 25 even when the rotation axis of the second pressure roller 25 does not match the rotation axis of the second-pressure roller drive shaft 36.

The roller drive unit 39 includes a drive-unit main body 41 and a rotation transmission mechanism 42. The drive-unit main body 41 includes a feed roller shaft 43 and a motor 45. The feed roller shaft 43 is formed like a rod, and it is rotatably supported by the fixed-side frame 2. The motor 45 is supported by the fixed-side frame 2, and it rotates the feed roller shaft 43 forward or backward. The first feed roller 22 is secured to the feed roller shaft 43 so that it is rotatably supported by the fixed-side frame 2. The first feed roller 22 rotates forward when the feed roller shaft 43 rotates forward, and it rotates backward when the feed roller shaft 43 rotates backward.

The rotation transmission mechanism 42 includes a first feed gear 51, an idler gear 52, a second feed gear 53, a first movable-side gear 54, and a second movable-side gear 55. The first feed gear 51 is formed into a circular plate shape, has teeth formed on its outer circumference, and is secured to the feed roller shaft 43. The idler gear 52 is formed in to a circular plate shape, has teeth formed on its outer circumference, and is rotatably supported by the fixed-side frame 2. The teeth of the idler gear 52 engage with the teeth of the first feed gear 51. The idler gear 52 rotates when the feed roller shaft 43 rotates.

The second feed gear 53 is formed into a circular plate shape, has teeth formed on its outer circumference, and is secured to the second feed roller 23. The teeth of the second feed gear 53 engage with the teeth of the idler gear 52. The second feed gear 53 rotates when the idler gear 52 rotates, and it rotates when the feed roller shaft 43 rotates. That is, the rotation transmission mechanism 42 causes the second feed roller 23 to rotate forward when the feed roller shaft 43 rotates forward and causes it to rotate backward when the feed roller shaft 43 rotates backward.

The first movable-side gear 54 is formed into a circular plate shape, has teeth formed on its outer circumference, and is secured to the first-pressure roller drive shaft 35. When the movable-side frame 3 is located at the closed position, the first movable-side gear 54 is in contact with the first feed gear 51 so that the teeth of the first movable-side gear 54 engage with the teeth of the first feed gear 51. While the movable-side frame 3 is located at the closed position, the first movable-side gear 54 rotates when the feed roller shaft 43 rotates. That is, while the movable-side frame 3 is located at the closed position, the rotation transmission mechanism 42 causes the first-pressure roller drive shaft 35 to rotate forward when the feed roller shaft 43 rotates forward and causes it to rotate backward when the feed roller shaft 43 rotates backward. When the movable-side frame 3 is located at the open position, the first movable-side gear 54 separates from the first feed gear 51 so that the teeth of the first movable-side gear 54 do not engage with the teeth of the first feed gear 51.

The second movable-side gear 55 is formed into a circular plate shape, has teeth formed on its outer circumference, and is secured to the second-pressure roller drive shaft 36. When the movable-side frame 3 is located at the closed position, the second movable-side gear 55 is in contact with the second feed gear 53 so that the teeth of the second movable-side gear 55 engage with the teeth of the second feed gear 53. While the movable-side frame 3 is located at the closed position, the second movable-side gear 55 rotates when the feed roller shaft 43 rotates. That is, when the movable-side frame 3 is located at the closed position, the rotation transmission mechanism 42 causes the second-pressure roller drive shaft 36 to rotate forward when the feed roller shaft 43 rotates forward and causes it to rotate backward when the feed roller shaft 43 rotates backward. When the movable-side frame 3 is located at the open position, the second movable-side gear 55 separates from the second feed gear 53 so that the teeth of the second movable-side gear 55 do not engage with the teeth of the second feed gear 53.

The rotation transmission mechanism 42 transmits rotation of the feed roller shaft 43 to the second feed roller 23 such that the number of rotations of the second feed roller 23 is equal to the number of rotations of the first feed roller 22. The rotation transmission mechanism 42 transmits rotation of the feed roller shaft 43 to the first-pressure roller drive shaft 35 such that the number of rotations of the first pressure roller 24 is equal to the number of rotations of the first feed roller 22. The rotation transmission mechanism 42 transmits rotation of the second feed roller 23 to the second-pressure roller drive shaft 36 such that the number of rotations of the second pressure roller 25 is equal to the number of rotations of the second feed roller 23. Therefore, the circumferential velocity of the second feed roller 23, the circumferential velocity of the first feed roller 22, the circumferential velocity of the first pressure roller 24, and the circumferential velocity of the second pressure roller 25 are the same. The circumferential velocity represents the value obtained by multiplying the number of rotations of a roller per unit time by the diameter of the roller.

Figure 5:
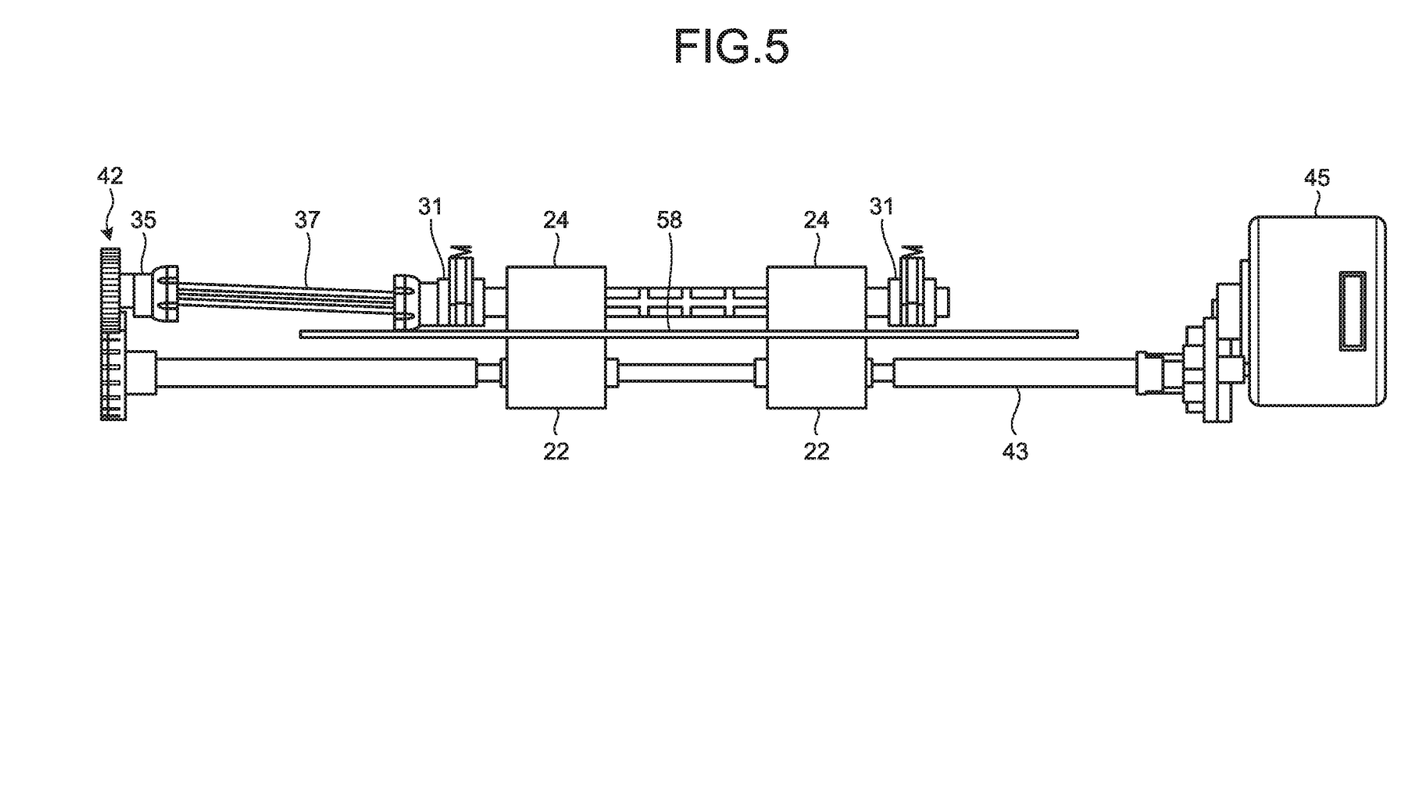
FIG. 5 is a front view of the conveying unit when a thin medium is provided on a medium-reading conveyance path.

FIG. 5 is a front view of the conveying unit 20 when a thin medium 58 is provided on the medium-reading conveyance path 17. As illustrated in FIG. 5, when the thin medium 58 is provided on the medium-reading conveyance path 17, the rotation axis of the first pressure roller 24 is may be located on a side closer to the first feed roller 22 than the rotation axis of the first-pressure roller drive shaft 35. As an example of the thin medium 58, a single medium made of a single sheet is explained. Because the first pressure roller 24 is translatable in a vertical direction, it is capable of properly pressing the thin medium 58 against the first feed roller 22 even when the thin medium 58 is provided on the medium-reading conveyance path 17. The first pressure roller 24 is capable of properly rotating with rotation transmitted from the first-pressure roller drive shaft 35 through the first joint unit 37 even when the thin medium 58 is provided on the medium-reading conveyance path 17. That is, the first feed roller 22 and the first pressure roller 24 are capable of properly conveying the thin medium 58 through the medium-reading conveyance path 17 even when the thin medium 58 is provided on the medium-reading conveyance path 17.

Figure 6:
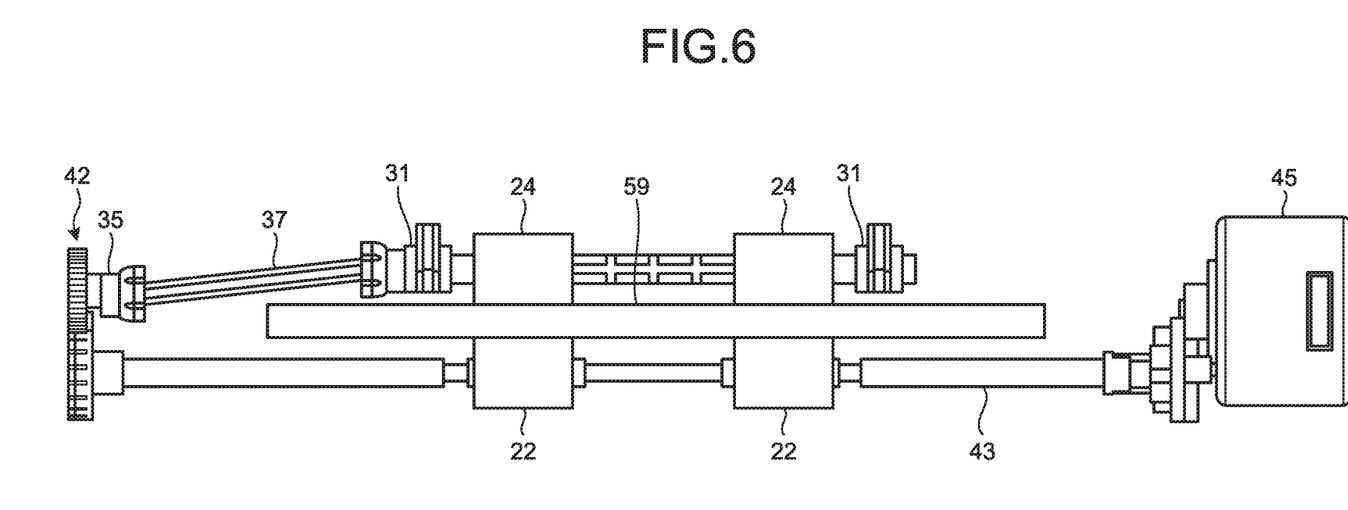
FIG. 6 is a front view of the conveying unit when a thick medium is provided on the medium-reading conveyance path.

FIG. 6 is a front view of the conveying unit 20 when a thick medium 59 is provided on the medium-reading conveyance path 17. As illustrated in FIG. 6, when the thick medium 59 is provided on the medium-reading conveyance path 17, the rotation axis of the first pressure roller 24 may be located on a side away from the first feed roller 22 than the rotation axis of the first-pressure roller drive shaft 35. An example of the thick medium 59 includes a booklet formed by binding a plurality of pieces of media. Because the first pressure roller 24 is translatable in a vertical direction, it is capable of properly pressing the thick medium 59 against the first feed roller 22 even when the thick medium 59 is provided on the medium-reading conveyance path 17. The first pressure roller 24 is capable of properly rotating with rotation transmitted from the first-pressure roller drive shaft 35 through the first joint unit 37 even when the thick medium 59 is provided on the medium-reading conveyance path 17. That is, the first feed roller 22 and the first pressure roller 24 are capable of properly conveying the thick medium through the medium-reading conveyance path 17 even when the thick medium 59 is provided on the medium-reading conveyance path 17.

In the same manner as the first pressure roller 24, the second pressure roller 25 may be arranged such that its rotation axis does not match the rotation axis of the second-pressure roller drive shaft 36. With the provision of the second joint unit 38, rotation of the feed roller shaft 43 may be properly transmitted even when the rotation axis of the second pressure roller 25 does not match the rotation axis of the second-pressure roller drive shaft 36 in the same manner as the first pressure roller 24.

The image reading device 10 further includes a separation rotation-transmitting mechanism (undepicted) that transmits rotation of the feed roller shaft 43 to the separation unit 21. Therefore, when the feed roller shaft 43 rotates forward, the separation unit 21 separates one medium in contact with the placement surface 15 from the media inserted into the medium-separation conveyance path 16 through the separation opening 7. When the feed roller shaft rotates forward, the separation unit 21 further conveys the separated medium from the separation opening 7 toward the meeting point 12 through the medium-separation conveyance path 16. The separation rotation-transmitting mechanism is formed such that the velocity of the medium conveyed by the separation unit 21 is equal to the velocity of the medium conveyed by the first feed roller 22 and the first pressure roller 24.

To prevent the remaining media that are included in the media and are different from the separated medium from being conveyed together with the medium to the side closer to the meeting point 12 than the separation unit 21, the separation unit 21 gives the remaining media with a resistive force that corresponds to the force for conveying them to the side closer to the meeting point 12. Because the resistive force is applied to the remaining media, the velocity of the medium conveyed by the separation unit 21 through the medium-separation conveyance path 16 may be lower than the velocity of the medium conveyed by the first feed roller 22 and the first pressure roller 24.

Figure 7:
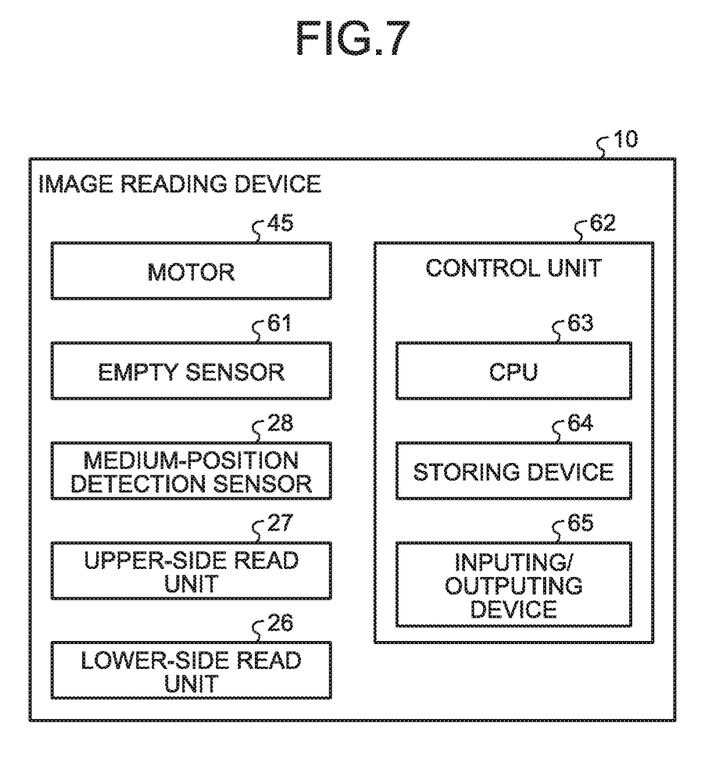
FIG. 7 is a block diagram of the image reading device.

FIG. 7 is a block diagram of the image reading device 10. As illustrated in FIG. 7, the image reading device 10 further includes an empty sensor 61 and a control unit 62. The empty sensor 61 detects whether a medium is placed on the hopper 14.

The control unit 62 is a computer, and it includes a central processing unit (CPU) 63, a storing device 64, and an inputting/outputting device 65. The CPU 63 executes computer programs installed in the control unit 62 to perform information processing and control the storing device 64 and the inputting/outputting device 65. The storing device 64 stores the computer programs and stores information used by the CPU 63. A memory such as a RAM or a ROM, a fixed disk drive such as a hard disk, a solid state drive (SSD), and/or an optical disk may be used as the storing device 64. The inputting/outputting device 65 is provided with a scan button so that it outputs information generated due to user's operation to the CPU 63 and outputs information generated by the CPU 63 for a user to recognize it. For example, the inputting/outputting device 65 is provided with a scan button so that it detects whether the scan button is pressed and outputs a detection result to the CPU 63.

The control unit 62 executes the computer programs to further control the motor 45, the empty sensor 61, the medium-position detection sensor 28, the lower-side read unit 26, and the upper-side read unit 27. Specifically, the control unit 62 controls the empty sensor 61 to detect whether a medium is placed on the hopper 14. The control unit 62 further switches a forward rotation mode and a backward rotation mode based on operation on the image reading device 10. The control unit 62 controls the motor 45 so that the feed roller shaft 43 rotates forward when switched to the forward rotation mode and the feed roller shaft 43 rotates backward when switched to backward rotation mode. The control unit 62 controls the medium-position detection sensor 28 to detect whether a medium is located at the medium detection position on the medium-reading conveyance path 17 or detect the timing in which the edge of a medium passes through the medium detection position. The control unit 62 controls the lower-side read unit 26 and the upper-side read unit 27 to read images on both sides of a medium conveyed by the medium-reading conveyance path 17.

Operation of the Image Reading Device 10

Figure 8:
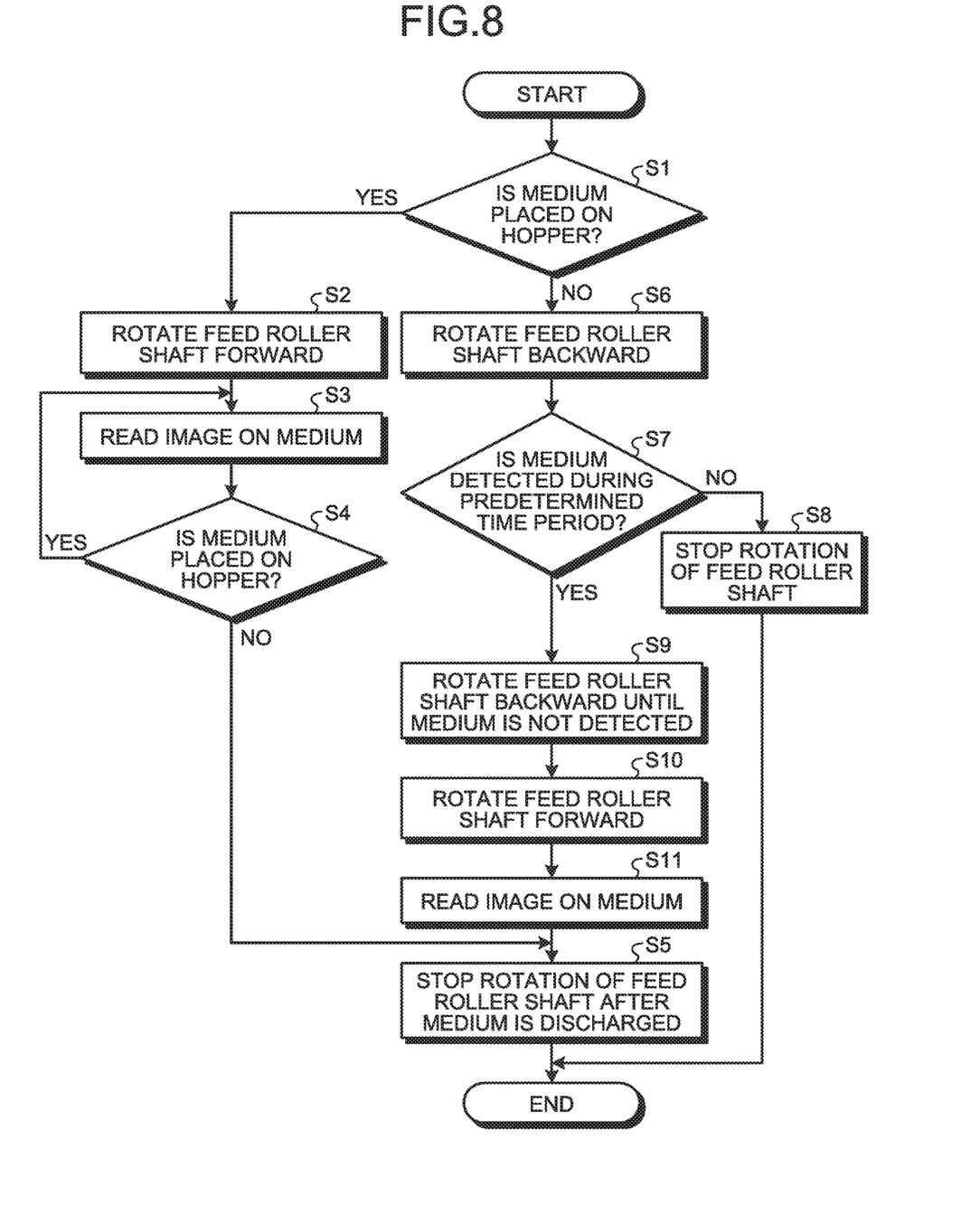
FIG. 8 is a flowchart of an operation of the image reading device.

FIG. 8 is a flowchart of an operation of the image reading device 10. When images on thin media need to be read by using the image reading device 10, a user places the thin media on the hopper 14 and then presses the scan button. Each piece of the thin media is for example made of an individual medium, and the thin media are not stitched and may be separated from one another. When the thin media is placed on the hopper 14, they are inserted into the separation opening 7 due to gravity and are brought into contact with the separation unit 21. When an image on a thick medium needs to be read by using the image reading device 10, a user presses the scan button and inserts the thick medium into the non-separation opening 8 so that the thick medium is sandwiched between the second feed roller 23 and the second pressure roller 25. An example of the thick medium 59 includes a booklet formed by binding a plurality of pieces of media.

The control unit 62 controls the inputting/outputting device 65 to detect whether the scan button is pressed while the image reading device 10 is activated. After it is detected that the scan button is pressed, the control unit 62 controls the empty sensor 61 to detect whether a medium is placed on the hopper 14 (Step S1). When it is detected that a medium is placed on the hopper 14 (Step S1, Yes), the control unit 62 switches to the forward rotation mode and controls the motor 45 to rotate the feed roller shaft 43 forward (Step S2).

When the feed roller shaft 43 rotates forward, the separation unit 21 separates a single thin medium in contact with the placement surface 15, included in thin media placed on the hopper 14, from the thin media. When the feed roller shaft 43 rotates forward, the separation unit 21 further conveys the separated thin medium from the separation opening 7 toward the meeting point 12 through the medium-separation conveyance path 16. When the feed roller shaft 43 rotates forward, the conveyance-path switch flap 29 is located at the separating and conveying position to guide the single thin medium, conveyed from the separation opening 7 toward the meeting point 12 through the medium-separation conveyance path 16, to the medium-reading conveyance path 17. The single thin medium conveyed from the separation opening 7 toward the meeting point 12 by the separation unit 21 is conveyed to the medium-reading conveyance path 17 and is sandwiched between the first feed roller 22 and the first pressure roller 24.

When the single thin medium is sandwiched between the first feed roller 22 and the first pressure roller 24, the first pressure roller 24 presses the sandwiched thin medium against the first feed roller 22. When the feed roller shaft 43 rotates forward, the first feed roller 22 rotates forward and the first pressure roller 24 rotates forward. When the first feed roller 22 and the first pressure roller 24 rotate forward, the single thin medium pressed by the first pressure roller 24 against the first feed roller 22 is conveyed toward the non-separation opening 8 through the medium-reading conveyance path 17.

After the single thin medium is passed through the medium detection position while it is conveyed by the first feed roller 22 and the first pressure roller 24 toward the non-separation opening 8 through the medium-reading conveyance path 17, it is conveyed between the lower-side read unit 26 and the upper-side read unit 27. When the feed roller shaft 43 rotates forward, the control unit 62 controls the medium-position detection sensor 28 to detect the leading-edge passing timing in which the leading edge of the single thin medium passes through the medium detection position and detect the trailing-edge passing timing in which the trailing edge of the single thin medium passes through the medium detection position. The control unit 62 controls the lower-side read unit 26 and the upper-side read unit 27 during the read period calculated based on the leading-edge passing timing and the trailing-edge passing timing that are detected, thereby reading images on both sides of the single thin medium (Step S3). After the single thin medium is passed between the lower-side read unit 26 and the upper-side read unit 27 while it is conveyed by the first feed roller 22 and the first pressure roller 24 toward the non-separation opening 8, it is sandwiched between the second feed roller 23 and the second pressure roller 25.

When the single thin medium is sandwiched between the second feed roller 23 and the second pressure roller 25, the second pressure roller 25 presses the sandwiched thin medium against the second feed roller 23. When the feed roller shaft 43 rotates forward, the second feed roller 23 rotates forward, and the second pressure roller 25 rotates forward. When the second feed roller 23 and the second pressure roller 25 rotate forward, the single thin medium sandwiched between the second feed roller 23 and the second pressure roller 25 is conveyed toward the non-separation opening 8 through the medium-reading conveyance path 17 and is discharged through the non-separation opening 8.

When it is detected that the media is placed on the hopper 14 (Step S4, Yes), the control unit 62 repeatedly performs the processing at Step S3 for the number of times that is equal to the number of pieces of thin media, thereby reading images on both sides of every thin medium placed on the hopper 14. When it is detected that no media is placed on the hopper 14 (Step S4, No), the control unit 62 controls the motor 45 to stop rotation of the feed roller shaft 43 after all the thin media are discharged through the non-separation opening 8 (Step S5).

When it is detected that no medium is placed on the hopper 14 immediately after the scan button is pressed (Step S1, No), the control unit 62 switches to the backward rotation mode and controls the motor 45 to rotate the feed roller shaft 43 backward (Step S6). When the feed roller shaft 43 rotates backward, the second feed roller 23 rotates backward, and the second pressure roller 25 rotates backward.

When a thick medium is sandwiched between the second feed roller 23 and the second pressure roller 25, the second pressure roller 25 presses the sandwiched thick medium against the second feed roller 23. When the second feed roller 23 and the second pressure roller 25 rotate backward, the thick medium pressed by the second pressure roller 25 against the second feed roller 23 is conveyed toward the meeting point 12 through the medium-reading conveyance path 17.

When the feed roller shaft 43 is rotating backward, the control unit 62 controls the medium-position detection sensor 28 to detect whether a thick medium is passed through the medium detection position during a predetermined time period after the time when the feed roller shaft 43 starts to rotate backward (Step S7). When it is not detected that a thick medium is passed through the medium detection position during the predetermined time period (Step S7, No), the control unit 62 controls the motor 45 to stop rotation of the feed roller shaft 43 (Step S8). Due to the processing from Step S7 to Step S8, the image reading device 10 may prevent the feed roller shaft 43 from continuously rotating backward when a thick medium is not properly conveyed through the medium-reading conveyance path 17.

When it is detected that a thick medium is passed through the medium detection position during the predetermined time period (Step S7, Yes), the control unit 62 continuously rotates the feed roller shaft 43 backward until the thick medium is not detected at the medium detection position (Step S9). After the thick medium is passed through the medium detection position while it is conveyed by the second feed roller 23 and the second pressure roller 25 toward the meeting point 12 through the medium-reading conveyance path 17, it is sandwiched between the first feed roller 22 and the first pressure roller 24. When the thick medium is sandwiched between the first feed roller 22 and the first pressure roller 24, the first pressure roller 24 presses the sandwiched thick medium against the first feed roller 22. When the feed roller shaft 43 rotates backward, the first feed roller 22 rotates backward, and the first pressure roller 24 rotates backward. When the first feed roller 22 and the first pressure roller 24 rotate backward, the thick medium pressed by the first pressure roller 24 against the first feed roller 22 is conveyed toward the meeting point 12 through the medium-reading conveyance path 17.

Figure 9:
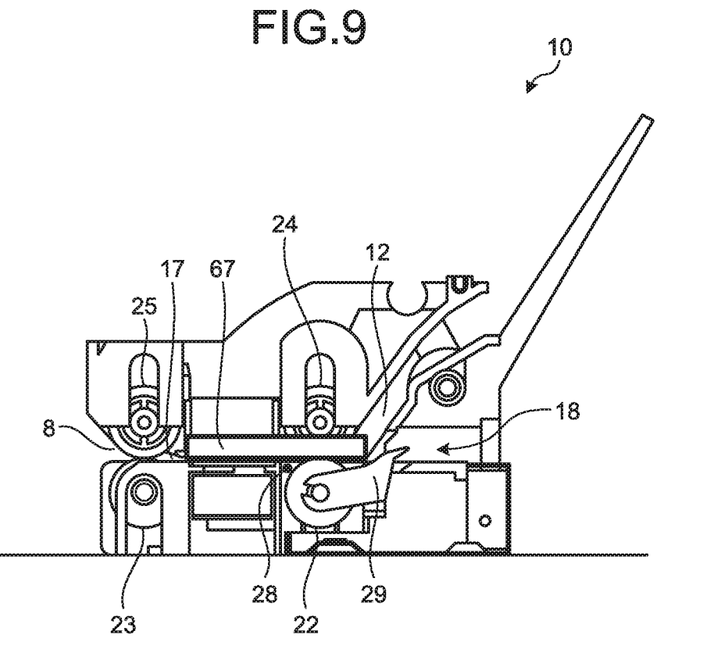
FIG. 9 is a sectional side view of the image reading device when a thick medium is conveyed from a non-separation opening toward a meeting point.

The conveyance-path switch flap 29 is located at the switchback conveying position when the feed roller shaft 43 rotates backward, and it guides the thick medium, conveyed through the medium-reading conveyance path 17 from the non-separation opening 8 toward the meeting point 12, to the medium-drawing conveyance path 18. FIG. 9 is a sectional side view of the image reading device 10 when a thick medium 67 is conveyed from the non-separation opening 8 toward the meeting point 12. As illustrated in FIG. 9, after the thick medium 67 is conveyed from the non-separation opening 8 toward the meeting point 12, it is guided to the medium-drawing conveyance path 18 because the conveyance-path switch flap 29 is located at the switchback conveying position. When the thick medium 67 is conveyed by the first feed roller 22 and the first pressure roller 24 toward the meeting point 12, it is conveyed to the medium-drawing conveyance path 18 and a trailing edge 68 separates from the second feed roller 23 and the second pressure roller 25.

Figure 10:
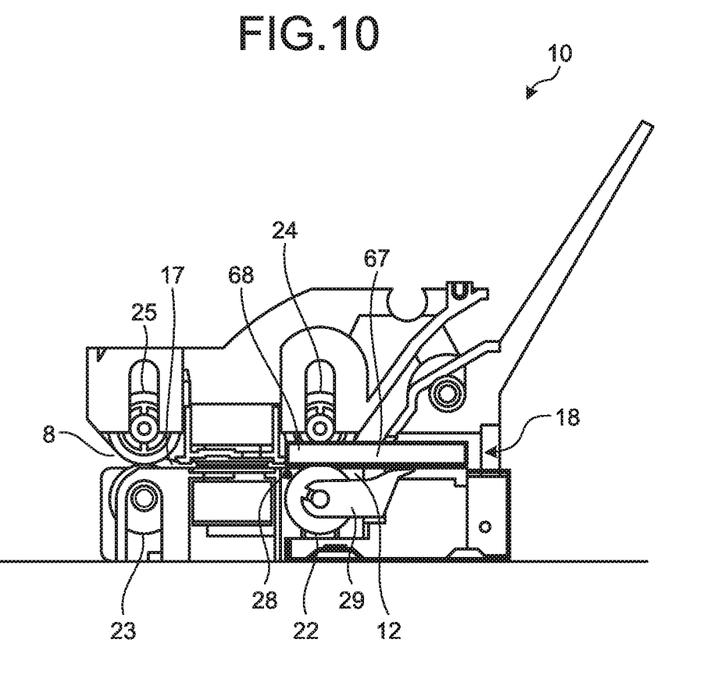
FIG. 10 is a sectional side view of the image reading device when the trailing edge of the thick medium passes through a medium detection position.

As illustrated in FIG. 10, when the thick medium 67 is further conveyed by the first feed roller 22 and the first pressure roller 24 toward the meeting point 12, the trailing edge 68 passes through the medium detection position. FIG. 10 is a sectional side view of the image reading device 10 when the trailing edge 68 of the thick medium 67 passes through the medium detection position. The control unit 62 controls the medium-position detection sensor 28 to detect the trailing-edge passing timing in which the trailing edge 68 of the thick medium 67 passes through the medium detection position. The control unit 62 controls the motor 45 to stop rotation of the feed roller shaft 43 immediately after the detected trailing-edge passing timing. Because rotation of the feed roller shaft 43 is stopped immediately after the trailing-edge passing timing of the thick medium 67, the thick medium 67 is stopped as being sandwiched between the first feed roller 22 and the first pressure roller 24.

Figure 11:
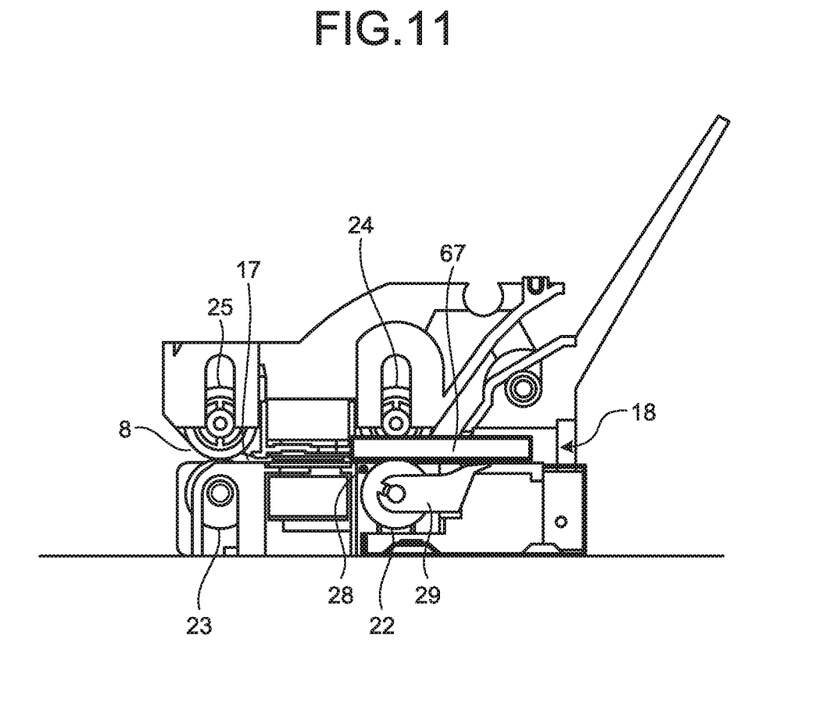
FIG. 11 is a sectional side view of the image reading device when the thick medium is conveyed from the meeting point toward the non-separation opening.

After rotation of the feed roller shaft 43 is stopped, the control unit 62 switches to the forward rotation mode and controls the motor 45 to rotate the feed roller shaft 43 forward (Step S10). When the first feed roller 22 and the first pressure roller 24 rotate forward, the thick medium 67 pressed by the first pressure roller 24 against the first feed roller 22 is conveyed toward the non-separation opening 8 through the medium-reading conveyance path 17. FIG. 11 is a sectional side view of the image reading device 10 when the thick medium 67 is conveyed from the meeting point toward the non-separation opening 8. After the thick medium 67 passes through the medium detection position by being conveyed toward the non-separation opening 8 through the medium-reading conveyance path 17, it is conveyed between the lower-side read unit 26 and the upper-side read unit 27. When the feed roller shaft 43 is rotating forward, the control unit 62 further controls the medium-position detection sensor 28 to detect the leading-edge passing timing and the trailing-edge passing timing in which both edges of the thick medium 67 pass through the medium detection position. The control unit 62 controls the lower-side read unit 26 and the upper-side read unit 27 to read images on both sides of the thick medium 67 during the read period calculated based on the leading-edge passing timing and the trailing-edge passing timing that are detected (Step S11). After the thick medium 67 passes between the lower-side read unit 26 and the upper-side read unit 27 by being conveyed toward the non-separation opening 8 by the first feed roller 22 and the first pressure roller 24, it is sandwiched between the second feed roller 23 and the second pressure roller 25.

When the thick medium 67 is sandwiched between the second feed roller 23 and the second pressure roller 25, the second pressure roller 25 presses the thick medium 67 against the second feed roller 23. When the feed roller shaft 43 rotates forward, the second feed roller 23 rotates forward, and the second pressure roller 25 rotates forward. The second feed roller 23 and the second pressure roller 25 rotate forward to convey the thick medium 67 toward the non-separation opening 8 through the medium-reading conveyance path 17 and discharge it through the non-separation opening 8. After the thick medium 67 is discharged through the non-separation opening 8, the control unit 62 controls the motor 45 to stop rotation of the feed roller shaft 43 (Step S5).

Due to this operation, because the thick medium 67 does not pass through the separation unit 21, the occurrence of defects such as bend may be prevented. Because the thick medium 67 is conveyed through the medium-reading conveyance path 17 and the medium-drawing conveyance path 18, it becomes less curved while it is conveyed. When the thick medium 67 is conveyed by the first feed roller 22 and the first pressure roller 24, both the first feed roller 22 and the first pressure roller 24 are driven, and therefore the occurrence of defects is prevented. When the thick medium 67 is conveyed by the second feed roller 23 and the second pressure roller 25, both the second feed roller 23 and the second pressure roller 25 are driven, and therefore the occurrence of defects is prevented. Bend is an example of the defects. Because defects occurring in the thick medium 67 are prevented, the image reading device 10 is capable of properly reading images on the thick medium 67.

Advantage of the Image Reading Device 10

The image reading device 10 according to the first embodiment includes the first feed roller 22, the first pressure roller 24, the first joint unit 37, the roller drive unit 39, the lower-side read unit 26, and the upper-side read unit 27. The first feed roller 22 is rotatably supported by the frame 1. The first pressure roller 24 is supported by the frame 1 in a rotatable and translatable manner, and it presses a medium against the first feed roller 22. The first joint unit 37 transmits rotation from the first-pressure roller drive shaft 35 to the first pressure roller 24. The roller drive unit 39 rotates both the first feed roller 22 and the first-pressure roller drive shaft 35. The lower-side read unit 26 and the upper-side read unit 27 read images on a medium conveyed when both the first feed roller 22 and the first pressure roller 24 are rotated. The image reading device 10 is capable of properly conveying a booklet and correctly reading images on a booklet as compared with different image reading devices in which the first pressure roller 24 is rotated by following the medium conveyed by the first feed roller 22.

The roller drive unit 39 in the image reading device 10 according to the first embodiment includes the drive-unit main body 41 and the rotation transmission mechanism 42. The drive-unit main body 41 rotates the first feed roller 22. The rotation transmission mechanism 42 transmits rotation from the drive-unit main body 41 to the first-pressure roller drive shaft 35, thereby rotating the first pressure roller 24. The image reading device 10 may be easily manufactured by decreasing the number of components as compared to different image reading devices in which a driving source for rotating the first feed roller 22 and a driving source for rotating the first pressure roller 24 are provided separately.

In the image reading device 10 according to the first embodiment, the first feed roller 22 and the first pressure roller 24 are rotated by using the single motor 45; however, two motors may be provided to rotate the first feed roller 22 and the first pressure roller 24. Even when two motors are provided, the image reading device 10 according to the first embodiment is capable of properly conveying a booklet and correctly reading images on a booklet.

The frame 1 of the image reading device 10 according to the first embodiment includes the fixed-side frame 2 that rotatably supports the first feed roller 22 and the movable-side frame 3 that supports the first pressure roller 24 in a rotatable and translatable manner. The movable-side frame 3 is movably supported by the fixed-side frame 2 such that it is located at the closed position or the open position. When the movable-side frame 3 is located at the closed position, the first pressure roller 24 presses a medium against the first feed roller 22. When the movable-side frame 3 is located at the open position, the first pressure roller 24 separates from the first feed roller 22 not to press a medium against the first feed roller 22. Because the movable-side frame 3 is movable with respect to the fixed-side frame 2, the image reading device 10 may facilitate maintenance of the first feed roller 22 and the first pressure roller 24.

The rotation transmission mechanism 42 in the image reading device 10 according to the first embodiment includes the first feed gear 51 to which rotation is transmitted from the drive-unit main body 41, and the first movable-side gear 54 that transmits rotation to the first-pressure roller drive shaft 35. When the movable-side frame 3 is located at the closed position, the first movable-side gear 54 engages with the first feed gear 51 to transmit rotation from the drive-unit main body 41 to the first-pressure roller drive shaft 35. When the movable-side frame 3 is located at the open position, the first movable-side gear 54 separates from the first feed gear 51 not to transmit rotation from the drive-unit main body 41 to the first-pressure roller drive shaft 35. Because the image reading device 10 is provided with the first feed gear 51 and the first movable-side gear 54, the movable-side frame 3 is movable relative to the fixed-side frame 2, and when the movable-side frame 3 is located at the closed position, the first feed gear 51 and the first-pressure roller drive shaft 35 may be properly rotated. In the image reading device 10, the movable-side frame 3 is rotatably supported by the fixed-side frame 2 so that the first feed gear 51 and the first movable-side gear 54 are separated from each other, whereby maintenance of the first feed gear 51 and the first movable-side gear 54 may be facilitated.

Although the movable-side frame 3 in the image reading device 10 according to the first embodiment is rotatably supported by the fixed-side frame 2, it may be secured to the fixed-side frame 2. Even when the movable-side frame 3 is secured to the fixed-side frame 2, the image reading device 10 is capable of properly conveying a booklet and correctly reading images on a booklet.

The image reading device 10 according to the first embodiment further includes the separation unit 21 that separates a medium from the media placed on the hopper 14, the second feed roller 23, and the second pressure roller 25 that presses a medium against the second feed roller 23. The roller drive unit 39 further rotates both the second feed roller 23 and the second pressure roller 25. The second feed roller 23 is arranged such that an area of the medium in contact with the first feed roller 22 is located between an area of the medium in contact with the separation unit 21 and an area of the medium in contact with the second feed roller 23. The first feed roller 22 is arranged such that an area of the medium in contact with the first feed roller 22 is located between an area of the medium in contact with the separation unit 21 and an area of the medium in contact with the lower-side read unit 26 and the upper-side read unit 27. The force of the first pressure roller 24 pressing a medium against the first feed roller 22 is larger than the force of the second pressure roller 25 pressing a medium against the second feed roller 23. The velocity of a medium conveyed by the separation unit 21 sometimes changes due to the separation unit 21 separating a single medium from the media. Due to an increase in the force of the first pressure roller 24 pressing a medium against the first feed roller 22, the image reading device 10 may reduce effects of fluctuations in the velocity of a medium conveyed by the separation unit 21 on the velocity of a medium conveyed for reading an image. Because the image reading device 10 prevents fluctuations in the velocity of a medium conveyed between the lower-side read unit 26 and the upper-side read unit 27, images on a medium may be properly read by using the lower-side read unit 26 and the upper-side read unit 27.

The image reading device 10 according to the first embodiment further includes the control unit 62 that switches the forward rotation mode and the backward rotation mode. When switched to the forward rotation mode, the control unit 62 controls the roller drive unit 39 to convey a medium from the first feed roller 22 toward the second feed roller 23. When switched to the backward rotation mode, the control unit 62 controls the roller drive unit 39 to convey a medium from the second feed roller 23 toward the first feed roller 22. The image reading device 10 changes the conveying direction of a medium, thereby conveying the thick medium 67 in a switchback manner. Due to switchback conveyance of the thick medium 67, the image reading device 10 may prevent the thick medium 67 from passing through the separation unit 21 or make the thick medium 67 less curved, whereby defects occurring in the thick medium 67 may be prevented. Because the image reading device 10 prevents defects occurring in the thick medium 67, images on the thick medium 67 may be properly read.

Second Embodiment

Figure 12:
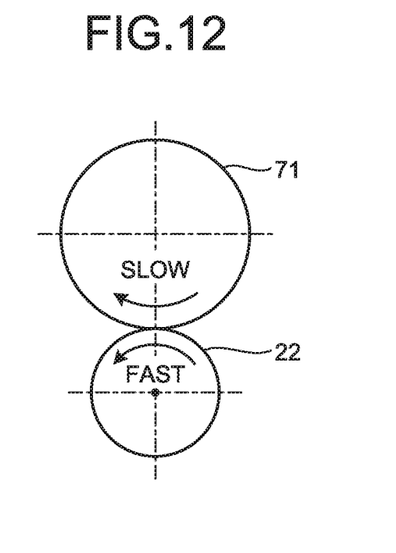
FIG. 12 is a side view of a first feed roller and a first pressure roller in the image reading device according to a second embodiment.

An image reading device according to a second embodiment is the same as the above-described image reading device 10 according to the first embodiment except that the first pressure roller 24 and the rotation transmission mechanism 42 are replaced with a different first pressure roller 71 and a different rotation transmission mechanism, respectively. FIG. 12 is a side view of the first feed roller 22 and the first pressure roller 71 in the image reading device according to the second embodiment. As illustrated in FIG. 12, the first pressure roller 71 is formed into a cylindrical shape in the same manner as the first pressure roller 24, and it is formed such that the diameter of the first pressure roller 71 is larger than the diameter of the first feed roller 22. The rotation transmission mechanism in the image reading device according to the second embodiment transmits rotation of the feed roller shaft 43 to the first-pressure roller drive shaft 35 such that the circumferential velocity of the first pressure roller 71 is equal to the circumferential velocity of the first feed roller 22.

In the same manner as the above-described image reading device 10 according to the first embodiment, the image reading device according to the second embodiment may prevent defects occurring in the thick medium 67 and may properly read images on the thick medium 67. In the image reading device according to the second embodiment, the diameter of the first pressure roller 71 is larger, therefore, when a thick medium is conveyed, the first pressure roller 71 may be properly lifted and the thick medium may be correctly conveyed, as compared with the above-described image reading device 10 according to the first embodiment. In the image reading device according to the second embodiment, the second pressure roller 25 may be replaced with a different second pressure roller having a larger diameter than that of the second feed roller 23.

Due to looseness formed by the rotation transmission mechanism 42 and the first joint unit 37, the first pressure roller 24 in the image reading device 10 according to the first embodiment sometimes rotates by following a medium in contact with the first pressure roller 24. When the first pressure roller 24 rotates by following a medium, defects such as bend may occur in the medium. Therefore, the rotation transmission mechanism 42 may be formed such that the circumferential velocity of the first pressure roller 24 is different from the circumferential velocity of the first feed roller 22, for example, the circumferential velocity of the first pressure roller 24 is higher than the circumferential velocity of the first feed roller 22. The image reading device 10 may prevent the first pressure roller 24 from rotating by following a medium and may prevent the occurrence of defects in a conveyed medium. The image reading device 10 according to the first embodiment changes the diameter of the first feed roller 22 or the diameter of the first pressure roller 24 so that the circumferential velocity of the first pressure roller 24 is different from the circumferential velocity of the first feed roller 22.

The disclosed image reading device is capable of reading images on a conveyed booklet easily and properly.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the disclosure have been described in detail, it should be understood that the various changes, substitutions, and alterations could be made hereto without departing from the spirit and scope of the disclosure.

What is claimed is:

1. An image reading device comprising:
a first roller that is rotatably supported by a frame;
a second roller that is supported by the frame in a rotatable and translatable manner and that presses a medium against the first roller;
a joint unit that transmits rotation from a drive shaft to the second roller;
a drive unit that rotates both the first roller and the drive shaft; and
a read unit that reads an image on a conveyed medium that is conveyed by the rotation of the both of the first roller and the second roller,
wherein
the drive unit includes:
a drive-unit main body that rotates the first roller; and
a rotation transmission mechanism that rotates the second roller by transmitting rotation from the drive-unit main body to the drive shaft,
the frame includes:
a first frame that rotatably supports the first roller; and
a second frame that supports the second roller in a rotatable and translatable manner,
the second frame is movably supported by the first frame such that the second frame is located at a first position or a second position,
the second roller 1) presses the medium against the first roller when the second frame is located at the first position and 2) separates from the first roller not to press the medium against the first roller when the second frame is located at the second position,
the rotation transmission mechanism includes:
a first gear to which rotation is transmitted from the drive-unit main body;
and
a second gear that transmits rotation to the drive shaft, and
the second gear 1) engages with the first gear to transmit rotation from the drive-unit main body to the drive shaft when the second frame is located at the first position and 2) separates from the first gear not to transmit rotation from the drive-unit main body to the drive shaft when the second frame is located at the second position.

2. The image reading device according to claim 1, wherein the rotation transmission mechanism is formed such that a circumferential velocity of the second roller is higher than a circumferential velocity of the first roller.

3. An image reading device comprising:
a first roller that is rotatably supported by a frame;
a second roller that is supported by the frame in a rotatable and translatable manner and that presses a medium against the first roller;
a joint unit that transmits rotation from a drive shaft to the second roller;
a drive unit that rotates both the first roller and the drive shaft;
a read unit that reads an image on a conveyed medium that is conveyed by the rotation of the both of the first roller and the second roller;
a separation unit that separates the medium from media placed on a hopper;
a third roller; and
a fourth roller that presses the medium against the third roller, wherein
the drive unit further rotates both the third roller and the fourth roller,
an area of the medium in contact with the third roller is located between an area of the medium in contact with the separation unit and an area of the medium in contact with the first roller, and
a force of the fourth roller pressing the medium against the third roller is larger than a force of the second roller pressing the medium against the first roller.

4. The image reading device according to claim 3, further comprising a controller configured to switch a first mode and a second mode, wherein
the controller
controls the drive unit so that the medium is conveyed from the first roller toward the third roller when switched to the first mode, and
controls the drive unit so that the medium is conveyed from the third roller toward the first roller when switched to the second mode.

* * * * *